United States Patent
Dardas

[15] 3,687,953
[45] Aug. 29, 1972

[54] DERIVATIVES OF DIPROPYLACETAMIDO-2-PYRIMIDINE

[72] Inventor: Anastasios Dardas, Grenoble, France

[73] Assignee: Berthier J. Laboratories S.A., Grenoble, France

[22] Filed: March 30, 1970

[21] Appl. No.: 23,988

Related U.S. Application Data

[63] Continuation of Ser. No. 675,067, Oct. 13, 1967, abandoned.

[52] U.S. Cl. ......260/256.4 N, 260/256.4 C, 260/999
[51] Int. Cl. ............................................C07d 51/42
[58] Field of Search ................260/256.4 N, 256.4 C

[56] References Cited

OTHER PUBLICATIONS

Benoit– Guyod, Chem. Abstracts, 70:86985e (1969).

Primary Examiner—Alex Mazel
Assistant Examiner—R. J. Gallagher
Attorney—Mason, Kolehmainen, Rathburn & Wyss

[57] ABSTRACT

Dipropylacetamido pyrimidine and the nuclear substituted alkyl, benzyl, alkoxy, halo, halomethyl or halobenzyl derivatives are described as useful in the preparation of proteins and as radio-protective materials.

3 Claims, No Drawings

DERIVATIVES OF DIPROPYLACETAMIDO-2-PYRIMIDINE

CROSS-REFERENCE TO CO-PENDING APPLICATION

This application is a continuation of my co-pending application Ser. No. 675,067 filed Oct. 13, 1967 now abandoned.

GENERAL DESCRIPTION OF THE INVENTION

The present invention relates to new chemical compositions which are dipropylacetamido-2-pyrimidine and derivatives thereof, corresponding to the following formula:

(I) 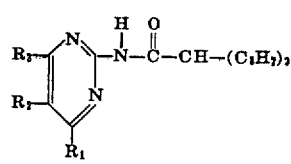

in which $R_1$, $R_2$, $R_3$ represent together or separately: an atom of hydrogen; a methyl, ethyl, butyl, propyl or benzyl group a methoxy or ethoxy group; a halogen atom; a trihalomethyl group; or a halobenzyl group; in particular the compound represented by the following formula:

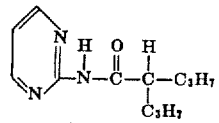

which is the amide of dipropylacetic acid and 2-amino pyrimidine or dipropylacetamido pyrimidine.

These products can serve as intermediates in the synthesis in the preparation of certain proteins as well as radio-protective materials. The unsubstituted product is useful as a tranquilizer, a hypnotic and a potentiator of tranquilizers and sedatives which use is the subject of a patent application Henry E. Meunier and Pierce L. Eymard Ser. No. 675,063 filed Oct. 13, 1967, now abandoned in favor of continuation-in-part application Ser. No. 855,776, filed Sept. 5, 1969, now U.S. Pat. No. 3,558,781 issued Jan. 26, 1971.

For the preparation of the compounds of the invention one can proceed in two different ways: either in the absence of solvent or in the presence of pyridine. In either case the final product obtained gives the same melting point, the same infrared spectrum and a similar spot in thin layer chromatography; it is therefore the same product.

The following Examples are presented in order to disclose the invention more fully. It should be understood, however, that they are not intended to limit the invention in any way.

EXAMPLE I

In the process of synthesis without solvent, one can utilize, as starting materials, 2 moles of 2-amino pyrimidine and 1 mole of dipropylacetic acid chloride.

The reaction can be represented by the following equation:

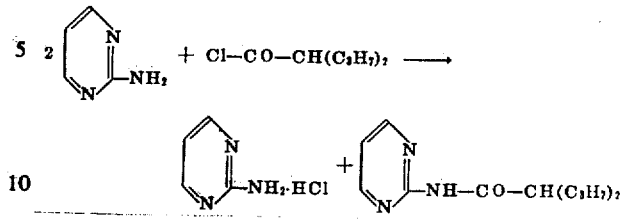

In a preferred manner of carrying out the invention, the starting materials are mixed and are heated for 1 hour at 60°–70° C. Then an alkaline extraction with ethyl ether is made, the base used being aqueous sodium hydroxide. The ethereal phase, on evaporation, gives a product A which is purified by recrystallization in ethyl alcohol or ethyl ether.

The purity of the product is verified by thin layer chromatography, the best system of chromatography found being the following:

adsorbent — Aluminum oxide G of Merck
eluent — Chloroform-acetone 8:2
developer — Iodine vapor The melting point is 101° C. after recrystallization.

The analysis of the amide corresponding to the formula $C_{12}H_{19}ON_3$ gives the following results:

calculated - C percent, 65.15; H percent, 8.5; N percent, 19.0;

found - C percent, 65.08; H percent, 8.65; N percent, 19.09;

Also, the amide that is the object of the invention is characterized by making infrared spectra of 2-amino pyrimidine, of dipropylacetic acid and of product A, in chloroform. The spectrum of product A is different from those of the two others in that it presents:

A. The peaks for $CH_3$, $CH_2$, CH in the zone of 2,800cm⁻ to 300cm⁻ which are due to the grouping

B. the peak of 3,400cm⁻ which corresponds to NH
C. the peaks at 1,700cm⁻¹ and 1,670cm⁻¹ due to

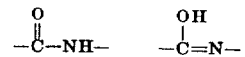

D. the large absorption peak typical of primidine from 715cm⁻¹ to 800cm⁻¹.

On the other hand, the peaks of 3,450cm⁻¹ and 1,610cm⁻ of $NH_2$ of the 2-amino pyrimidine no longer exist.

The obtained product A is therefore the following amide:

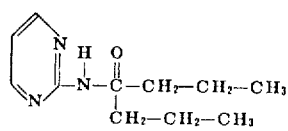

EXAMPLE II

In the method of preparation in the presence of a solvent, the mixture of reactants is heated in pyridine for an hour at 60°–70° C. After a partial evaporation of the pyridine under vacuum the hydrochloride of pyrimidine precipitates, the remainder is filtered and is evaporated. Thus is obtained a solid product that is recrystallized in alcohol and which is designated as B. It shows the same melting point, the same I.R. spectrum and gives the same spot in thin layer chromatography as the product obtained in the absence of pyridine. Therefore, in both cases it is the same amide. The yield is 60 percent of the theoretical yield.

While the unsubstituted dipropylacetamido-2-pyrimidine has been described in Examples I and II it is obvious that all of the substituted compounds of this invention as depicted in the general formula I can be prepared by reaction of dipropylacetic acid chloride and the corresponding amino pyrimidine.

Others may practice the invention in any of the numerous ways which will be suggested by this disclosure to one skilled in the art by employing one or more of the novel features disclosed or equivalents thereof.

I claim:

1. A compound of the formula:

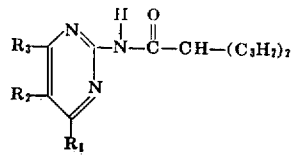

wherein $R_1$, $R_2$ and $R_3$ are selected independently from the group consisting of hydrogen, lower alkyl, benzyl, lower alkoxy, halogen, trihalomethyl and halobenzyl, the number of carbon atoms in the lower alkyl radicals being between one and four inclusive.

2. The compound as defined in Claim 1 wherein at least one of $R_1$, $R_2$ and $R_3$ are lower alkyl and the remaining ones are hydrogen, the number of carbon atoms in the lower alkyl radicals being between one and four inclusive.

3. The compound as defined in claim 1 wherein $R_1$, $R_2$ and $R_3$ are hydrogen.

* * * * *